(No Model.) 6 Sheets—Sheet 1.
R. N. ROSS & H. H. KELLER.
BRICK MACHINE.
No. 394,510. Patented Dec. 11, 1888.
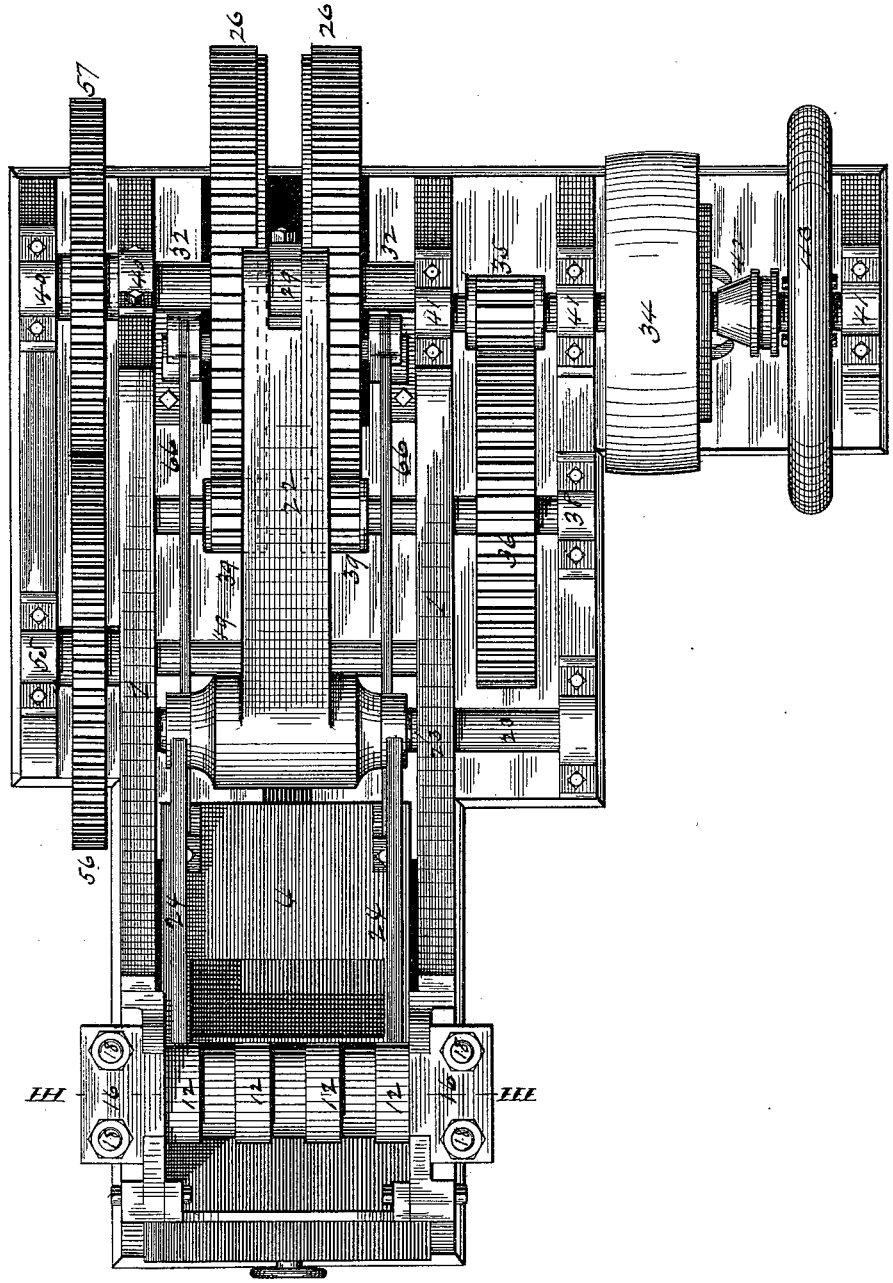
Fig. I.
Attest:
H. S. Knight
Emma Arthur.
Inventors,
Robt. N. Ross.
Henry H. Keller.
By Knight Bros
Attys.

(No Model.) 6 Sheets—Sheet 2.
R. N. ROSS & H. H. KELLER.
BRICK MACHINE.
No. 394,510. Patented Dec. 11, 1888.
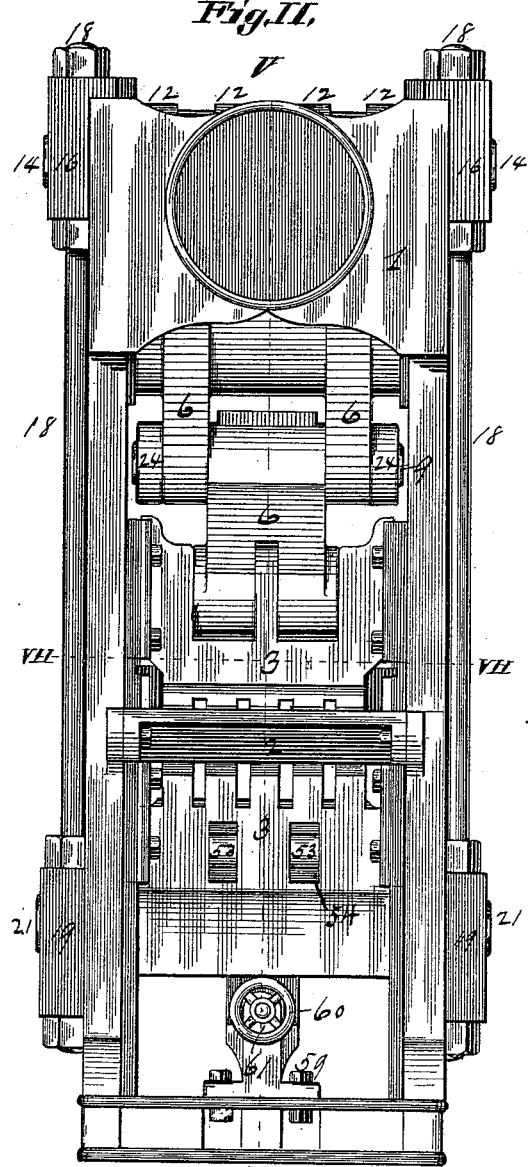
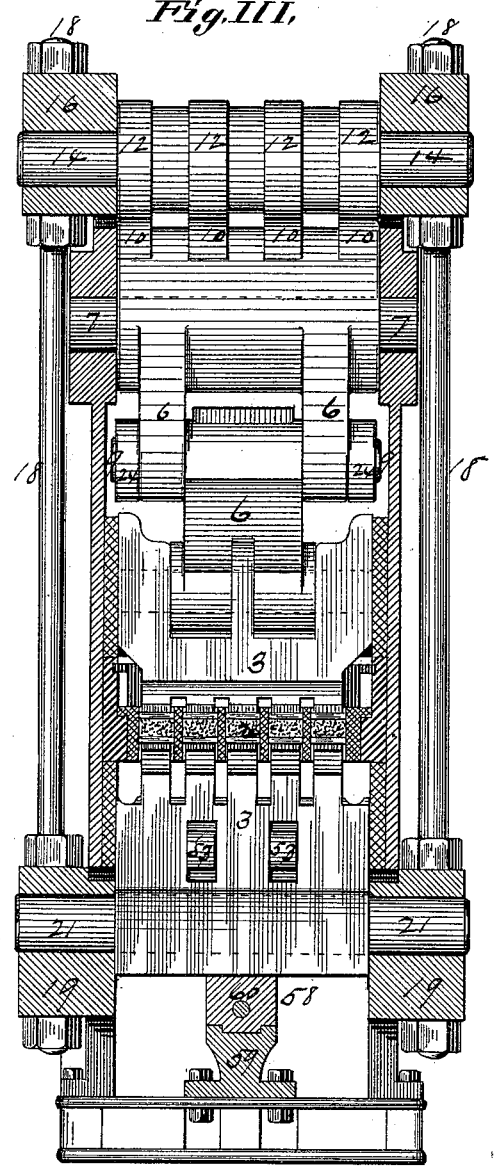
Attest:
H. S. Knight
Emma Arthur
Inventors:
Rob't N. Ross
Henry H. Keller
By Knight Bros
Atty's (No Model.) 6 Sheets—Sheet 3.
R. N. ROSS & H. H. KELLER.
BRICK MACHINE.
No. 394,510. Patented Dec. 11, 1888.
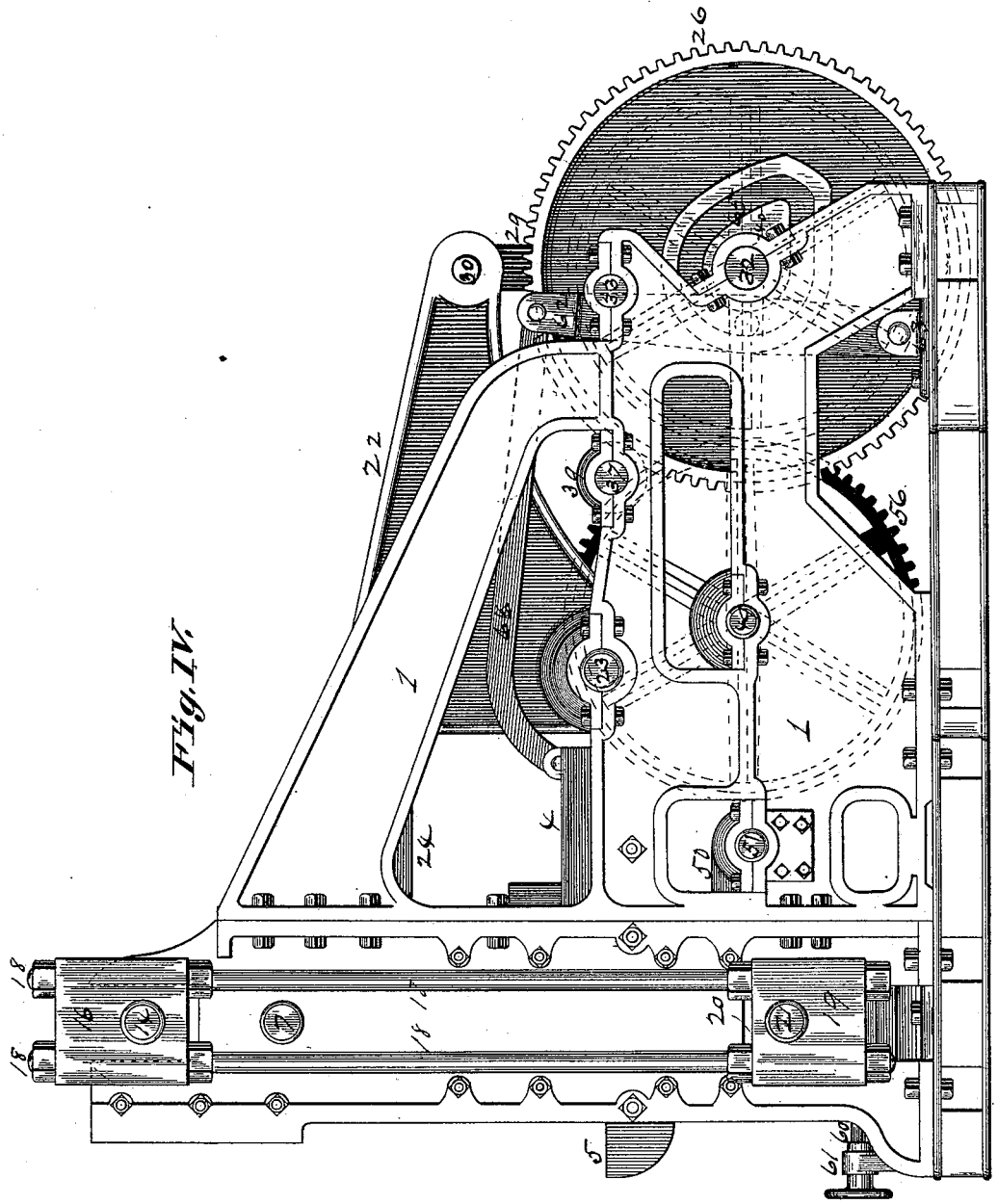

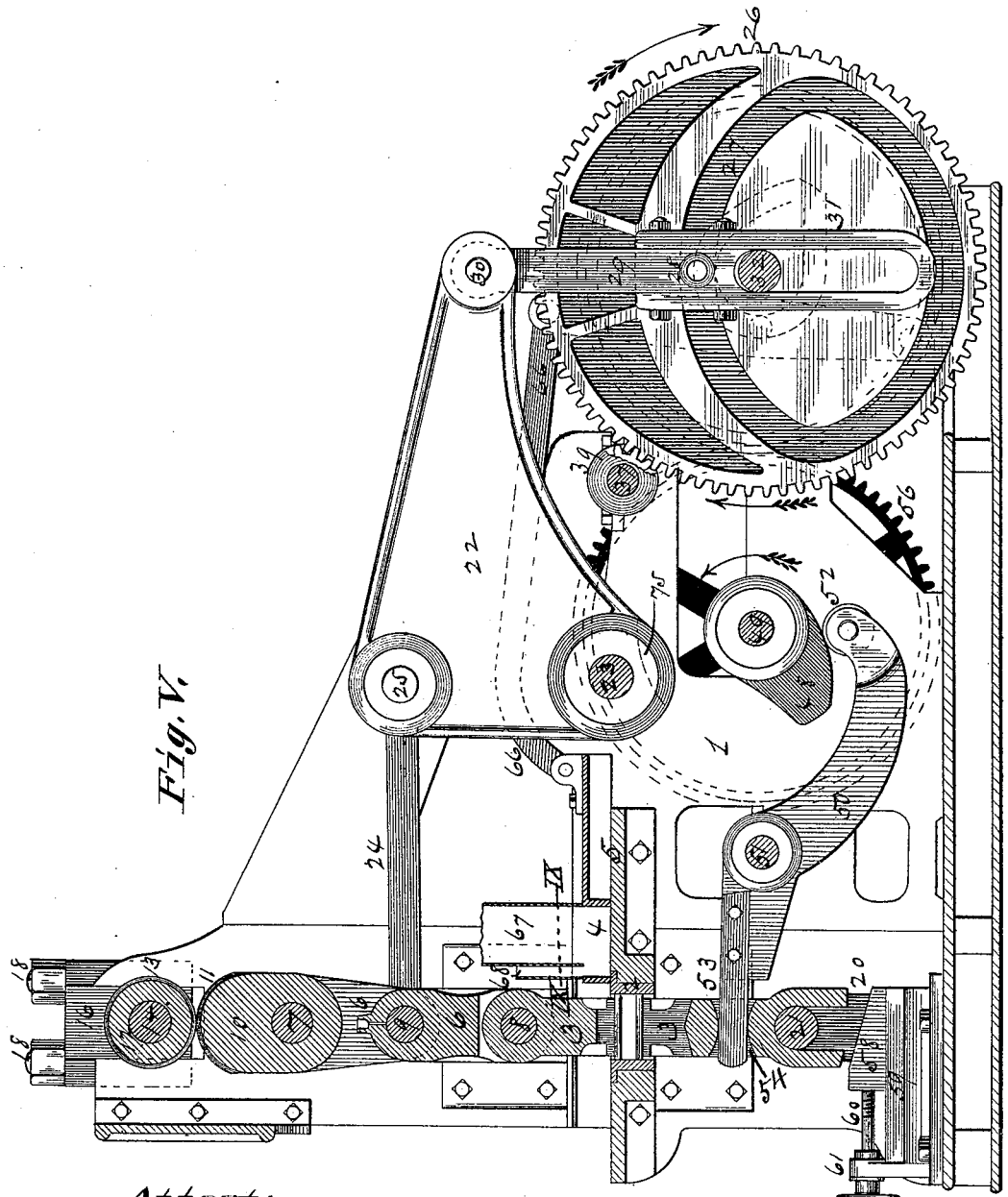

(No Model.) 6 Sheets—Sheet 5.
R. N. ROSS & H. H. KELLER.
BRICK MACHINE.
No. 394,510. Patented Dec. 11, 1888.
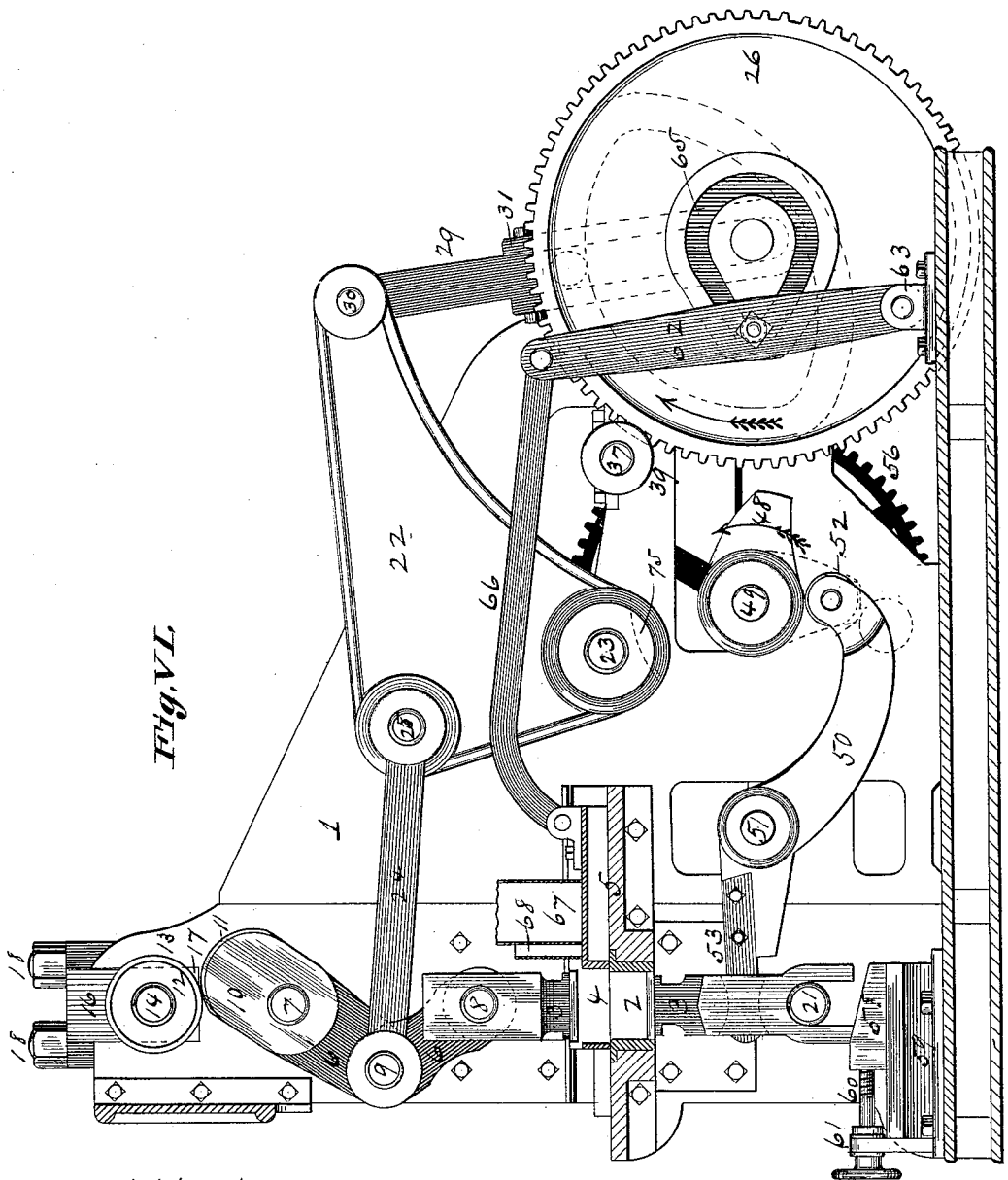
Fig. VI.
Attest:
H. S. Knight.
Emma Arthur.
Inventors,
Robt. N. Ross.
Henry H. Keller.
By Knight Bros
Attys (No Model.) 6 Sheets—Sheet 6.
R. N. ROSS & H. H. KELLER.
BRICK MACHINE.
No. 394,510. Patented Dec. 11, 1888.
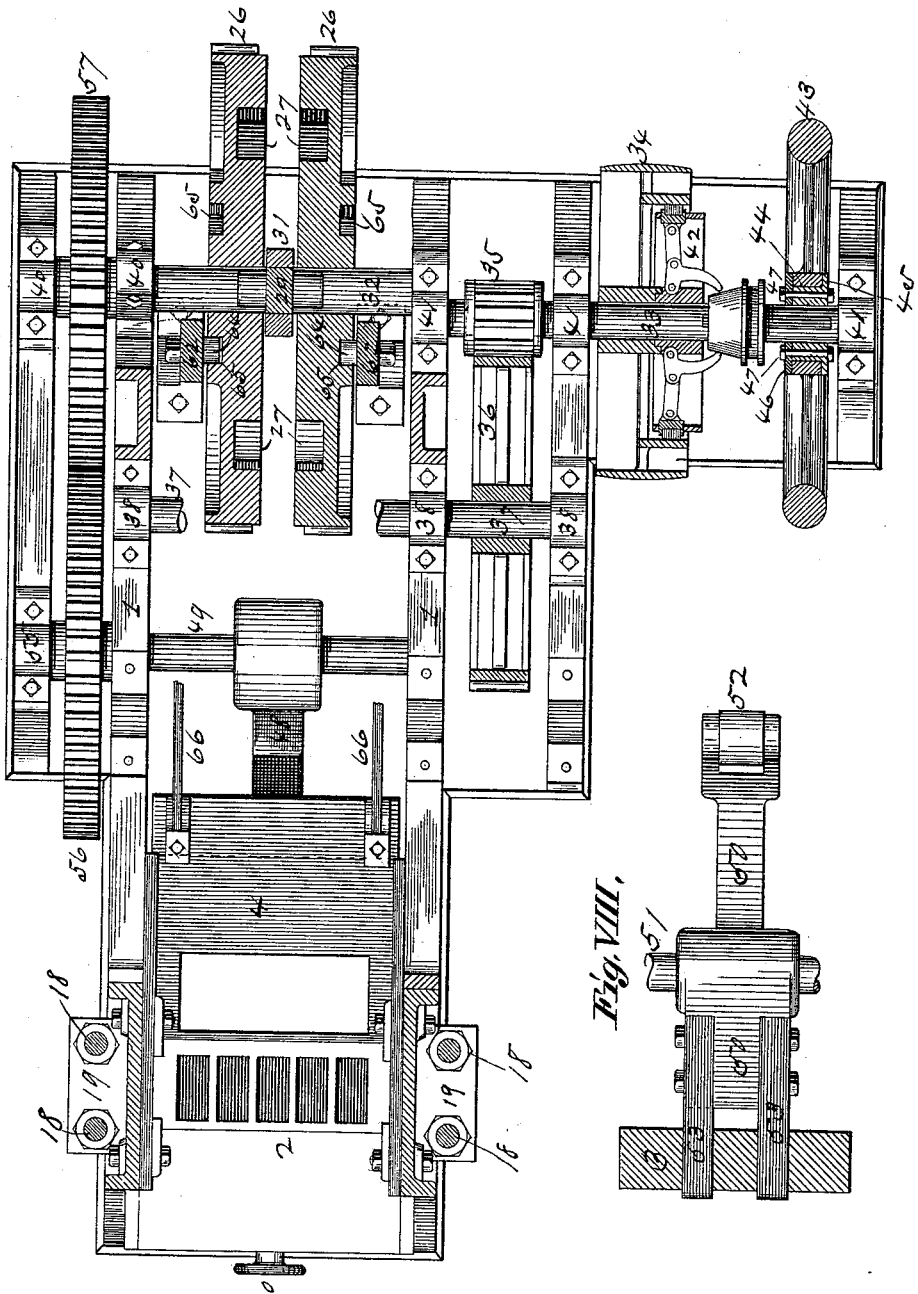
Attest:
H. Knight
Emma Arthur
Inventors,
Rob't N. Ross.
Henry H. Keller.
By Knight Bros
Att'ys

UNITED STATES PATENT OFFICE.

ROBERT N. ROSS AND HENRY H. KELLER, OF ST. LOUIS, MISSOURI.

BRICK-MACHINE.

SPECIFICATION forming part of Letters Patent No. 394,510, dated December 11, 1888.

Application filed March 21, 1887. Serial No. 231,712. (No model.)

*To all whom it may concern:*

Be it known that we, ROBERT N. ROSS and HENRY H. KELLER, both of the city of St. Louis, in the State of Missouri, have invented a certain new and useful Improvement in Brick-Machines, of which the following is a full, clear, and exact description, reference being had to the accompanying drawings, forming part of this specification, and in which—

Figure I is a top or plan view of our improved machine. Fig. II is a front elevation. Fig. III is a vertical transverse section taken on line III III, Fig. I. Fig. IV is a side elevation. Figs. V and VI are vertical longitudinal sections taken on line V VI, Fig. II, Fig. V showing the plungers advanced and the charger retracted, and Fig. VI showing these parts in the reverse position. Fig. VII is a horizontal longitudinal section taken on line VII VII, Fig. II. Fig. VIII is a top view of the lever for lifting the lower plunger to eject the bricks from the mold, a section of the lower plunger being shown. Fig. IX is a horizontal section of the hopper, taken on line IX IX, Fig. V.

Our invention relates to certain improvements in brick-machines; and our invention consists in features of novelty, hereinafter fully described, and pointed out in the claims.

Referring to the drawings, 1 represents the frame of the machine, 2 the mold, 3 the plungers, 4 the charger, and 5 the table on which the charger slides or moves, all of which *per se* are common.

The upper plunger is connected by toggle-bars 6 to a shaft or rod, 7, fitting in the frame 1. The plunger is made fast to the lower end of the under toggle-bar by a pin, 8, and the adjacent ends of the bars are connected by a pin, 9. Located on the shaft or rod 7 are one or more cams, 10, (we have shown four,) which are preferably faced with some hard metal, as shown at 11. Located over these cams are rollers or cams 12, preferably faced, as shown at 13, and secured to a shaft or rod, 14, fitting in sliding boxes 16, held in slots or openings 17 of the frame of the machine, wherein they are held from horizontal movement, but are allowed to move vertically. As the toggle (formed of the bars 6) is moved from the position shown in Fig. VI to the position shown in Fig. V, the blocks are raised by the cams 10 working against the rollers 12, and as the toggle is moved back the blocks fall again to their former position.

The blocks project beyond the frame, as shown in Fig. II, and are connected outside of the frame by rods 18 to similar blocks, 19, fitting and sliding in slots 20 in the lower part of the frame. Through the blocks 19 passes a rod or shaft, 21, on which is the lower plunger, 3. The lower plunger is thus connected to the upper block, 16, and is lifted with it, and, as before stated, this lifting takes place as the toggle depresses the upper plunger, so that the two plungers are thus made to approach each other to form the bricks by one toggle, and this, being located over the charger, does not become loaded or covered with falling dirt or dust, which has been such an objection heretofore in toggle-machines, owing to the journals of the toggle wearing rapidly by being cut by the clay collecting thereon. The parts are so adjusted that the apexes of the cams 10 bear against the rollers 12 as the plungers reach their forward strokes, thus adding greatly to the power of the machine. The toggle 6 is operated by means of a lever, 22, preferably of triangular or bell-crank shape and pivoted to the frame of the machine by a shaft or rod, 23. It is connected by one or more pitmen or links, 24, (we have shown two,) to the toggle, the links fitting over the pin or rod 9 at their outer ends and being made fast at their inner ends to the lever by a pin or rod, 25. It will be seen that as the lever is moved from the position shown in Fig. VI to the position shown in Fig. V, and vice versa, the toggle will be operated. We have shown the lever moved by wheels 26, having cam-grooves 27, in which fits a pin, 28, on an arm, 29, pivoted to the outer end of the lever by a pin, 30. The arm has a strap, 31, secured to it, that straddles the shaft 32 of the cam-wheels, and this strap acts to hold the arm in place.

The wheels 26 receive their power from a main shaft, 33, provided with a driving-pulley, 34, and a pinion, 35, meshing into a cog-wheel, 36, on a shaft, 37, journaled in boxes 38, secured to the frame and provided with pinions 39, that mesh into cogs on the cam-wheels. The shaft 32 of the cam-wheels is secured to the frame of the machine by journal-boxes 40, and the main shaft is likewise secured to the frame of the machine by journal-boxes 41.

The main shaft is provided with a clutch arrangement, 42, in which no invention is claimed herein, and it has a fly-wheel, 43, peculiarly connected to it. The connection is made by means of a hub, 44, rigid on the shaft and provided with a flange, 45, at one end. On this hub snugly fits the fly-wheel, and it is held thereon by a disk, 46, and bolts 47. (See Fig. VII.) There is sufficient friction between the hub and wheel for the latter to be carried by the former when the machine is in motion; but they are sufficiently loose for the wheel to slip slightly on the hub as the machine stops and starts, so that its inertia and momentum will both be gradually overcome. Each time the pressing is done and just as the upper plunger begins to ascend a cam, 48, on a shaft, 49, comes against the inner end of a lever, 50, fulcrumed to the frame of the machine by a pin, 51. The inner end of the lever has a friction-roller, 52, against which the cam bears, and the outer end of the lever has two arms, 53, bolted to it that fit in holes 54 in the lower plunger to lift it to eject the bricks.

The cam-shaft 49 is journaled in boxes 55, secured to the frame of the machine, and it is provided with a cog-wheel, 56, meshing into a similar wheel, 57, on the shaft 32. The shaft 49 is thus turned.

58 represents a wedge sliding on a bed or base, 59, beneath the lower plunger. The wedge is adjusted in or out by a set-screw, 60, passing through an arm, 61, on the base, and its office or function is to regulate the fall of the plunger and the consequent depth of the mold, of which the plunger forms the bottom.

The charger is operated by levers 62, pivoted to brackets 63, secured to the base of the machine and provided with pins 64, Fig. VII, engaging cam-grooves 65 in the outer faces of the wheels 26. (See Figs. VI and VII.) The upper ends of the levers are connected by pitmen or links 66 to the charger.

67 represents a hopper, under which the charger is brought as it recedes and from which the charger is filled. This hopper is provided with an air chute or passage, 68, at one side or end of it, through which the air that is forced down in advance of the clay escapes, instead of passing out in front of the charger, carrying the fine clay with it, which is deposited on the table of the machine and is carried by the charger the next time it advances against the ends of the bricks last formed, thereby injuring the bricks by causing the fine clay to stick to them. With our air-chamber this is avoided. The chamber preferably extends along the front of the hopper, as shown in Fig. IX.

The feed is a box-charger and is intended to confine the clay and prevent it from passing in front of the forward wall and being brought into contact with the pressed bricks and sticking thereto. It is to this form of charger that our hopper with air-outlet is particularly adapted, for the free exit allowed the air prevents it passing over the forward wall of charger and carrying the fine clay with it and resulting seriously, as above stated.

It will be seen on referring to Fig. I that the hub of the lever 22 extends almost entirely across the machine between the two parts of the frame 1. As the cam 48 (see Fig. V) is also in the center of the machine, it is necessary to provide a notch in the hub of the lever 22, as indicated by dotted line 75, to allow the cam to pass the hub.

We claim as our invention—

1. In a brick-machine, the combination, with the upper and lower plungers, of a toggle for moving the upper plunger, mechanism for operating the toggle, cam operated by said toggle, roller bearing on the cam, sliding blocks in which the roller is mounted, a sliding block which supports the lower plunger, and rods connecting the roller-blocks with the plunger-block, as and for the purpose herein set forth.

2. In a brick-machine, the combination of the upper and lower plungers, upper and lower sliding blocks, rods connecting the sliding blocks, a toggle having its upper link fulcrumed to the frame and its lower link connected to the upper plunger, a cam on the fulcrumed end of the toggle, whereby the upper blocks, and through them the lower plunger, are raised, and mechanism for operating the toggle, substantially as and for the purposes herein set forth.

3. In a brick-machine, the combination of the upper and lower plungers, upper and lower sliding blocks, rods connecting the blocks, rollers mounted in the upper blocks, toggle connected to the upper plunger, cam operated by the toggle and against which said rollers bear, and mechanism for moving the toggle, consisting of a pivoted lever, a pitman connecting the lever to the toggle, an arm connected to the lever and provided with a pin, and a cam for operating the arm, substantially as set forth.

4. The combination, with a lower plunger, an upper plunger, and a sliding block above the upper plunger, the said block being connected to the lower plunger, of a toggle and means for operating the same, one end of said toggle being connected to the upper plunger and the other pivoted a distance from its end beneath the block, whereby the projecting end acts as a cam on said block, as set forth.

5. In a brick-machine, the combination of a plunger, toggle connected to the plunger, pivoted lever connected to the toggle, an arm connected to the lever, and wheels having cams operating the arm to impart motion to the toggle, substantially as set forth.

6. In a brick-machine, the combination of a plunger, toggle connected to the plunger, pitman connected to the toggle, pivoted triangular-shaped lever to which the pitman is secured, arm connected to the lever, cam-wheels provided with cam-grooves, and a pin on the arm fitting in the grooves in the wheels, substantially as and for the purpose set forth.

7. In a brick-machine, in combination with a box-charger and means for operating it, a hopper provided with a chute or passage communicating with and permitting the escape of air from said charger, substantially as set forth.

8. In a brick-machine, the combination of a box-charger and a hopper having an air-passage, 68, communicating with and permitting the escape of air from the charger when the clay enters the same, substantially as and for the purpose set forth.

9. In a brick-machine, the combination of a plunger, a toggle connected by a pitman to the upper part of the vertical edge of a lever, such as 22, which is pivoted at the lower part of its vertical edge and connected at the end of its horizontal edge to a rod, 29, lifted by pin 28, working in cam 27, and guided by the slot 31, working on the axis 32, whereby vertical movement of the rod 29 is transmitted to the toggle horizontally, as set forth.

ROBERT N. ROSS.
HENRY H. KELLER.

In presence of—
GEO. H. KNIGHT,
JOSEPH WAHLE.